United States Patent Office 3,480,036
Patented Nov. 25, 1969

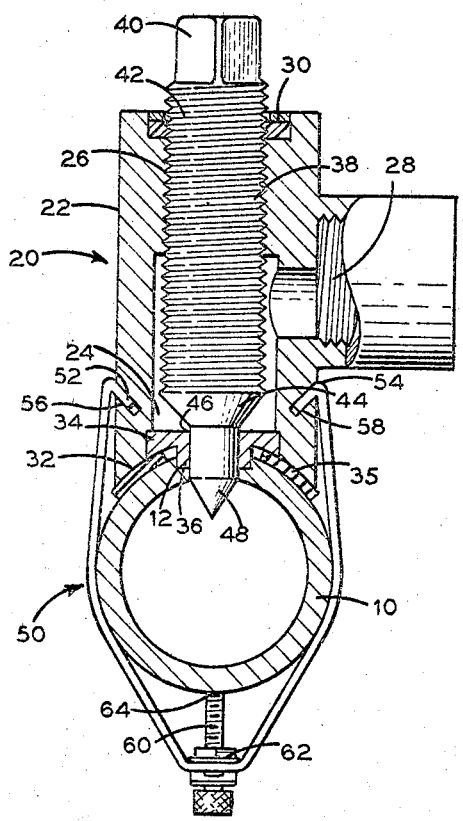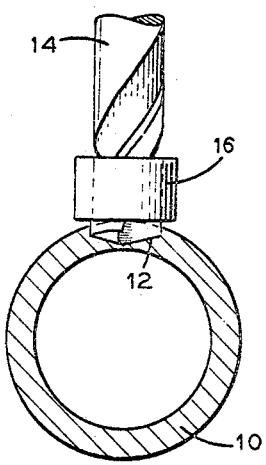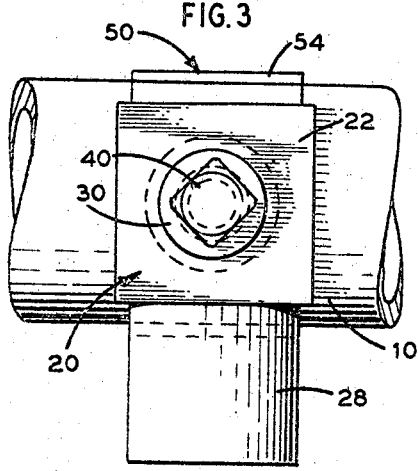

3,480,036
LINE TAP VALVE AND METHOD FOR TAPPING INTO A PIPELINE
Henry Ehrens, Bayside, N.Y., and Sidney Weiner, Cresskill, N.J., assignors to Sealed Unit Parts Co., Inc., Allenwood, N.J., a corporation of New York
Filed June 14, 1967, Ser. No. 645,924
Int. Cl. F16l 41/06, 55/00
U.S. Cl. 137—318                                9 Claims

ABSTRACT OF THE DISCLOSURE

The wall of a pipeline has drilled therein a pilot hole which does not completely pass through the wall. A line tap valve which includes a valve body carrying a valve stem through a valve chamber is fitted onto the pipeline by means of a strap. The bottom end of the valve chamber is closed off by a washer with a centerbored boss. The boss fits into the pilot hole. An end of the valve stem having a piercing element passes through the centerbore of the boss and is driven through the portion of the pipeline opposite the pilot hole. Thereafter the propelling and retraction of the valve stem provides the valving action between the valve chamber and the pipeline.

---

This invention pertains to line tap valves, for use in tapping a pipeline, generally to remove the fluid from the line to which it may be connected, or to inject a fluid into the line and its associated system.

In our U.S. Patent No. 3,252,474, issued May 24, 1966 we disclosed an improved line tap valve. While that valve admirably performs its desired function with certain types of pipelines (particularly refrigerant lines using copper tubing) it created a demand for even more versatile line tap valves (particularly those that can be used with steel pipe and the like).

Lately, there has been a demand for tapping into pipeline so that pre-existing pipelines can feed new fluid utilization devices. If it were possible to shut off the flow of fluid in the pre-existing pipeline the tapping would present no problems. However, in many pipeline systems it is either inconvenient or prohibitively expensive to shut down the pipeline. For example, in an illuminating gas distribution network for a residential area the main feed runs underground along a street and pipes tap off from the main feed and run underground into the homes. Generally there is a control valve in the street near the tap-off and another within the home. If for some reason, one desires to tap off from the portion of the pipe between the valves, it is necessary to dig a hole at the desired tap off point and also at the location of the street control valve. While the first hole is required for access to the line, the second hole is a nuisance and expense. If it were possible to tap into the line without shutting off the street control valve it would not be necessary to dig the second hole.

It is accordingly a prime object of the invention to provide an improved line tap valve which can be inserted in a pipeline while the pipeline carries fluid without the fluid escaping.

It is another object of the invention to provide such a line tap valve which can be used with steel pipe.

It is a further object of the invention to provide an improved method for tapping into fluid carrying pipelines.

Other objects, the features and advantages of the invention will be apparent from the following detailed description of the invention when read with the accompany drawings which show by way of example and not limitation, the now preferred embodiment of the invention.
In the drawings:

FIGURE 1 shows a sectional view of a pipeline being prepared for tapping in accordance with the invention;
FIGURE 2 shows a sectional view of the line tap valve of the invention connected to the pipeline of FIGURE 1; and
FIGURE 3 shows a top view of the line tap valve and pipeline of FIGURE 2.

Referring to FIGURE 1, there is shown a pipeline 10 being prepared to receive a line tap valve. There is drilled into pipeline 10 a pilot hole 12 by drill 14. Drill 14 is provided with a stop collar 16 which controls the depth of the pilot hole 12 in the wall of the pipeline 10. The hole is drilled deep enough to remove most of the wall material without actually piercing the pipeline.

Then, the line tap valve 20 of FIGURE 2 is fitted to pipeline. Before describing this fitting procedure line tap valve 20 will be described. Valve 20 comprises a valve body 22 having a valve chamber 24, a tightly pitched valve-stem-supporting threaded passageway 26 and a fluid outlet passageway 28 communicating with valve chamber 24. Packing members 30 at the end of passageway 26 provide a fluid seal. The bottom of valve body 22, as viewed in FIGURE 2, is provided with a pipe engaging face 32. Face 32 is contoured to mate with the outerwall of pipeline 10. Fixed to face 32 is a gasket 35 of resilient material to compensate for any mismating of the face 32 and the outerwall of pipeline 10. Sealing off the bottom of valve chamber 24 is a washer 34 with a boss 36. Boss 36 extends beyond face 32 and is shaped to fit in pilot hole 12. Washer 34 is provided with a centerbore which passes through boss 36.

The valve stem 38 which has the dual function of a valve stem and a pipe piercing tool comprises: a wrench-receiving head 40; a threaded shaft 42 which meshes with valve-stem-supporting passageway 26; a valving shoulder 44 having the shape of the frustum of a cone which co-operates with the valve seat defined by the inner peripheral edge 46 of the washer 34; and a pointed piercing element 48. When washer 34 is made of a metal such as copper or its alloys which is softer than valve stem 38 which is preferably hardened steel, the conical geometry of valve shoulder 44 provides excellent fluid sealing properties.

The valve body 22 is mounted on pipeline 10 through the agency of strap 50. Strap 50 is preferably made of high-tensile-strength spring steel. Strap 50 is primarily bent in the shape of a U. The ends 52 and 54 are bent back through an angle of greater than ninety degrees to become hooklike elements which fit in slots 56 and 58 in opposite sidewalls of valve body 22. The slots 56 and 58 extend obliquely toward the face 32 of valve body 22. The central portion of strap 50 is provided with a hole through which passes a screw 60. Screw 60 passes through threaded nut 62 which is carried by strap 50.

When line tap valve 20 is to be mounted on pipeline 10 valve stem 38 is retracted so that piercing element 48 does not extend beyond the bottom of boss 36. Strap 50 is not connected to valve body 22 and screw 60 is retracted. After the pilot hole 12 has been drilled a mechanic places face 32 of valve body 22 against pipeline 10 and so aligns it that boss 36 fits into pilot hole 12. Then strap 50 is hooked onto valve body 22. In particular, end 52 is fitted into slot 56 and end 54 is fitted into slot 58. Screw 60 is then propelled toward pipeline 10 until the end 64 of screw 60 is driven sufficiently hard against pipeline 10 so that gasket 35 seals the interface between the outerwall of pipeline 10 and the face 32 of valve body 22. A wrench (not shown) is applied to head 40 and valve stem 38 is propelled downward. As piercing element 48 is driven through the wall of pipeline 10 valve shoulder 44 moves toward seat 46. The geometry is so chosen that when element 48 completely pierces the pipeline wall the valve is closed.

When the valve is to be opened valve stem 38 is retracted until element 48 is in valve body 24. At that time, there is an unobstructed passage between pipeline 10 and passageway 28, via the centerbore of washer 36 and valve chamber 24.

Thus there has been shown an improved line tap valve and a method for tapping a line while the line carries fluid without any leakage of fluid. In a simple operation, the line is tapped and a valve fitted into the line.

What is claimed is:

1. A line tap valve for use with a pipeline that has a partially drilled pilot hole, such valve comprising:
a valve body having a pipeline engaging face contoured to rest matingly against a portion of the pipeline,
a valve chamber in said body,
a washer member fitted in said valve body in the region of said pipeline-engaging face, said washer member including a depending boss portion extending outward from said pipeline-engaging face and contoured to fit in said partially drilled pilot hole to locate said valve body on said pipeline, said washer member being provided with an opening passing therethrough in the region of said boss portion and communicating with said valve chamber,
a valve stem member movably supported by said valve body and passing through said valve chamber and the opening in said washer member, the end of said valve stem passing through said washer member including a pipeline piercing element, and a valve shoulder behind said pipeline piercing element for seating on the portion of said washer member defining the periphery of the opening,
an outlet passageway in said valve body communicating with said valve chamber,
and means for coupling said valve body to the pipeline.

2. The line tap valve of claim 1 further comprising a gasket on said pipeline-engaging face adapted to be received between said washer and the pipeline to provide a fluid seal.

3. The line tap valve of claim 1 wherein said valve shoulder has the shape of the frustum of a cone.

4. The line tap valve of claim 1 wherein said coupling means comprises a strap of high-tensile-strength material having first and second ends, said strap being disposed around the pipeline and connected to said valve body by the ends of said strap.

5. The line tap valve of claim 4 wherein said valve body is provided with a pair of slots in opposed side walls of said valve body, said slots being aligned in directions toward said pipeline-engaging face of said valve body, and the ends of said strap being bent back through an angle of greater than ninety degrees for mating engagement in said slots.

6. The line tap valve of claim 4 wherein the portion of said strap that is to be located opposite the partially drilled pilot hole is provided with an opening for accepting a screw member, a screw member passing through said opening and provided with an end for abutting the surface of the pipeline so that as said screw member is rotated said strap pulls the pipeline-engaging face of said valve body in intimate contact with the pipeline.

7. The line tap valve of claim 5 and wherein the portion of said strap that is to be located opposite the partially drilled pilot hole is provided with an opening for accepting a screw member, a screw member passing through said opening and provided with an end for abutting the surface of the pipeline so that as said screw member is rotated said strap pulls the pipeline-engaging face of said valve body in intimate contact with the pipeline.

8. The line tap valve of claim 7 further comprising a gasket on said pipeline-engaging face to provide a fluid seal.

9. The line tap valve of claim 8 wherein said valve shoulder has the shape of the frustum of a cone.

References Cited

UNITED STATES PATENTS

| | | | |
|---|---|---|---|
| 210,706 | 12/1878 | Penney | 137—318 X |
| 2,050,985 | 8/1936 | Trickey | 285—199 X |
| 2,644,720 | 7/1953 | Carr | 285—198 X |
| 3,252,475 | 5/1966 | Jones | 137—318 |

WILLIAM F. O'DEA, Primary Examiner

D. R. MATTHEWS, Assistant Examiner

U.S. Cl. X.R.

77—41; 285—198